(No Model.)
E. O. DAVIS.
HOOF CLEANER.
No. 274,570. Patented Mar. 27, 1883.
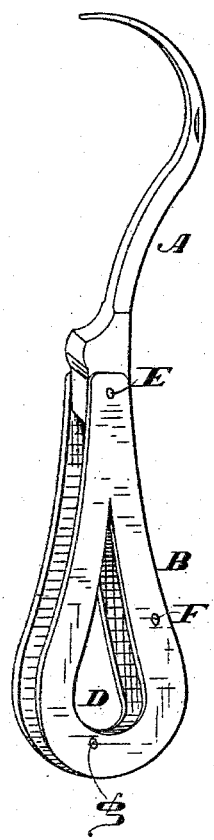
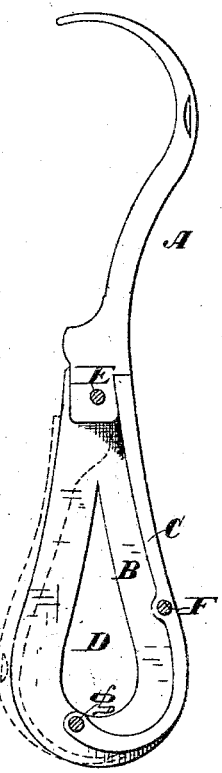
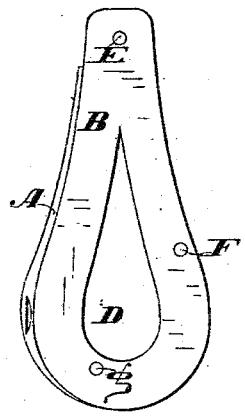
Witnesses:
A. M. Tanner
C. T. Belt
Inventor.
Edward O. Davis
By Paine & Ladd,
Attorneys.

UNITED STATES PATENT OFFICE.

EDWARD O. DAVIS, OF YOUNGSTOWN, OHIO.

HOOF-CLEANER.

SPECIFICATION forming part of Letters Patent No. 274,570, dated March 27, 1883.

Application filed August 30, 1882. (No model.)

*To all whom it may concern:*

Be it known that I, EDWARD O. DAVIS, a citizen of the United States, residing at Youngstown, in the county of Mahoning and State of Ohio, have invented certain new and useful Improvements in Hoof-Cleaners; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to improvements in implements for cleaning and removing stones, dirt, and gravel from horses' hoofs; and the object of my improvement is to provide a hoof-cleaner that can be conveniently carried in the pocket, and which shall still be strong enough and have a hook long enough for effective use in removing clay, fine gravel, and other matter lodged between the hoof and shoe. I attain this result by constructing the hook or hoof-cleaner in the manner illustrated by the accompanying drawings, in which—

Figure 1 is a perspective view of the hook open. Fig. 2 is a side elevation of the same with one side of the handle removed, and Fig. 3 is a view of the implement closed.

The hook-blade A is made with a long, thin, curved hook, of the shape clearly shown by drawings as being best adapted for reaching far under the shoe, and is hinged, like the blade of a jack-knife, to a handle formed of the side plates, B, and spring C. The side pieces, B, are made of thin plates cut spatulate, with the curve of the bottom edges conforming to the curve of the hook, and the top part tapering down to the width of the base of the hook at the hinge. The centers of the side plates of the handle are cut out, so as to leave a marginal strip of substantially uniform width, sufficient to cover the spring and the hook when closed. It will thus be seen that the center of the handle has an opening, D, clear through. The sides and spring are held together by the pivot-rivet E and rivets F and $g$, and the latter rivet, retaining the lower end of the spring, is set in near the edge of the opening D, and the spring is curved in from the outside edges of the side plates at the back of the handle to the rivet $g$, so as to leave a claw-shaped space outside of the spring at the bottom of the handle, in which the point of the hook fits when shut, as shown by dotted lines in Fig. 2.

I am aware that hooks have been heretofore made hinged to a handle; but by the construction above described a hook can be made light enough to be conveniently carried in the pocket and of a sufficient size and curvature to be a serviceable instrument.

What I claim as new, and desire to secure by Letters Patent, is—

The hoof-cleaner herein described, consisting of the hook A, and the handle formed of the spatulate side plates, B, having the open centers D, and the spring C, as and for the purpose set forth.

In testimony whereof I affix my signature in presence of two witnesses.

EDWARD O. DAVIS.

Witnesses:
 VOLNEY W. CORIN,
 EARNEST A. JONES.